US011143330B2

(12) United States Patent
Yokoe

(10) Patent No.: US 11,143,330 B2
(45) Date of Patent: Oct. 12, 2021

(54) VALVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 82 days.

(21) Appl. No.: 16/611,483

(22) PCT Filed: Apr. 24, 2018

(86) PCT No.: PCT/JP2018/016519
§ 371 (c)(1),
(2) Date: Nov. 7, 2019

(87) PCT Pub. No.: WO2018/207609
PCT Pub. Date: Nov. 15, 2018

(65) Prior Publication Data
US 2020/0141514 A1 May 7, 2020

(30) Foreign Application Priority Data
May 9, 2017 (JP) .............................. JP2017-092849

(51) Int. Cl.
*F16K 31/04* (2006.01)
*F25B 41/20* (2021.01)
(Continued)

(52) U.S. Cl.
CPC .......... *F16K 39/045* (2013.01); *F16K 11/074* (2013.01); *F16K 31/042* (2013.01);
(Continued)

(58) Field of Classification Search
CPC ........... Y10T 137/86533; Y10T 137/87; Y10T 137/87298; F25B 41/20; F16K 3/0209;
(Continued)

(56) References Cited

U.S. PATENT DOCUMENTS 3,559,685 A 2/1971 Defries
4,219,049 A * 8/1980 Skelly ................... F16K 11/074
137/625.3
(Continued)

FOREIGN PATENT DOCUMENTS

DE 4139815 6/1993
JP 2001141093 5/2001
(Continued)

OTHER PUBLICATIONS

"International Search Report (Form PCT/ISA/210)" of PCT/JP2018/016519, dated Jul. 31, 2018, with English translation thereof, pp. 1-4.

*Primary Examiner* — Seth W. Mackay-Smith
(74) *Attorney, Agent, or Firm* — JCIPRNET

(57) ABSTRACT

A valve device is provided. In the valve device, a valve element is rotated about a support shaft, based on rotation of a valve element drive member to switch a through hole that communicates with an outlet formed in a valve seat to adjust a flow rate. The through hole opens in a bottom surface of a flow channel securing groove formed in the valve element. The flow channel securing groove has a long hole shape in which a width in a first direction being a moving direction of the valve element, is smaller than a width in a second direction orthogonal to the first direction. Thus, a region overlapping with the outlet is large as compared to a case where a perfect circular flow channel securing groove is formed.

11 Claims, 9 Drawing Sheets

(51) Int. Cl.
  *F16K 11/07* (2006.01)
  *F16K 39/04* (2006.01)
  *F16K 11/074* (2006.01)
(52) U.S. Cl.
  CPC ............. *F25B 41/20* (2021.01); *Y10T 137/87* (2015.04); *Y10T 137/87298* (2015.04)
(58) Field of Classification Search
  CPC ...... F16K 3/08; F16K 11/074; F16K 11/0743; F16K 31/041; F16K 31/042
  See application file for complete search history.

(56) References Cited

U.S. PATENT DOCUMENTS

| | | | | |
|---|---|---|---|---|
| 4,281,684 A | * | 8/1981 | Broeg | F16K 11/074 137/625.21 |
| 5,150,690 A | * | 9/1992 | Carter | F02B 43/00 123/527 |
| 6,634,380 B2 | * | 10/2003 | Bartkus | F16K 11/0743 137/625.46 |
| 6,708,691 B1 | * | 3/2004 | Hayek | F16K 11/074 128/205.24 |
| 6,758,234 B2 | * | 7/2004 | Bradley | F16K 3/08 137/102 |
| 7,819,948 B2 | * | 10/2010 | Wagner | F16K 3/10 95/100 |
| 8,191,578 B2 | * | 6/2012 | Weiss | F16K 11/0743 137/625.17 |
| 9,109,824 B2 | * | 8/2015 | Pawlik | F16K 11/074 |
| 2015/0276070 A1 | * | 10/2015 | Yokoe | F16K 31/535 251/248 |

FOREIGN PATENT DOCUMENTS

| | | |
|---|---|---|
| JP | 2001516861 | 10/2001 |
| JP | 5615993 | 10/2014 |
| WO | 2014081037 | 5/2014 |
| WO | 2014147897 | 9/2014 |
| WO | 2017208785 | 12/2017 |

* cited by examiner

VALVE DEVICE

CROSS-REFERENCE TO RELATED APPLICATION

This application is a 371 application of the international PCT application serial no. PCT/JP2018/016519, filed on Apr. 24, 2018, which claims the priority benefits of Japan application no. 2017-092849 filed on May 9, 2017. The entirety of each of the abovementioned patent applications is hereby incorporated by reference herein and made a part of this specification.

TECHNICAL FIELD

The present invention relates to a valve device for adjusting a flow rate of fluid.

BACKGROUND ART

Patent Literature 1 describes a refrigerant valve device for adjusting a supply amount of refrigerant for cooling an interior of a refrigerator. In the refrigerant valve device of Patent Literature 1, a valve chamber is formed between a base including a valve seat surface on which a refrigerant inlet and a refrigerant outlet open and a cover that covers the base. A valve element is arranged in the valve chamber to overlap with the refrigerant outlet. The valve element rotates about an axis orthogonal to the valve seat surface, based on rotation of an output gear rotated by a stepping motor. A through hole (orifice) is formed in the valve element. The orifice includes a narrow tube part through which fluid passes. When the valve element is positioned at a rotational position where the refrigerant outlet formed on the valve seat surface and the orifice overlap, the fluid flows through the orifice. In addition, the valve element may be positioned at a rotational position where the refrigerant outlet and the orifice do not overlap so that the fluid flows through a pathway by way of a flow channel groove formed in the valve element.

CITATION LIST

Patent Literature

[Patent Literature 1] Japanese Patent No. 5615993

SUMMARY OF THE INVENTION

Problems to be Solved by the Invention

The refrigerant valve device of Patent Literature 1 controls the rotational position of the valve element by the number of driving steps of the stepping motor. Thus, in rotational positions of the valve element, variations due to component tolerances are generated. For example, a variation in rotational positions of the valve element is generated due to a variation, and the like in magnetization of a magnet of the stepping motor. Therefore, to allow the fluid to flow at a flow rate corresponding to a hole diameter of the orifice even if there is a variation in rotational positions of the valve element, the valve element is formed with a circular concave part around the orifice. An inner diameter of the concave part is larger than that of the orifice. Therefore, even if there is a displacement between the position of the orifice and the refrigerant outlet, due to a variation in rotational positions of the valve element, if the overlap between the concave part and the refrigerant outlet is greater than or equal to a cross-sectional area of the orifice, it is possible to circulate the fluid at a flow rate corresponding to a narrow tube diameter of the orifice.

However, as in Patent Literature 1, if a perfect circular concave part around the through hole (orifice) is formed in the valve element, a circular space around the through hole is required to be secured in the valve element. Therefore, there is a problem that a degree of freedom in position where the through hole is formed is low.

In view of the above problems, an object of the present invention is to provide a valve device capable of flowing fluid at a flow rate corresponding to a hole diameter of a through hole formed in a valve element even if there is a variation in positions of the valve element, and having a high degree of freedom in position of the through hole.

Means for Solving the Problem

To solve the above problems, a valve device of the present invention includes: a valve chamber to be supplied with fluid; a valve seat surface provided inside the valve chamber; a valve element mounted at a position overlapping with an opening part provided in the valve seat surface; a valve element drive member that moves the valve element along the valve seat surface; and a drive source that drives the valve element drive member, wherein the valve element includes a concave part provided on an abutment surface abutting against the valve seat surface, and a through hole opening in a bottom surface of the concave part, and in the concave part, a width in a first direction being a movement direction of the valve element by the valve element drive member is smaller than a width in a second direction orthogonal to the first direction.

According to the present invention, when the valve element is moved, the through hole formed in the valve element and the opening part formed in the valve seat surface can be communicated. The valve element is formed with a concave part larger than the hole diameter of the through hole, and the through hole opens in the bottom surface of the concave part. Therefore, even if there is a variation in positions of the valve element, as long as a size of the concave part corresponds to the variation, the fluid can be flowed at a flow rate corresponding to the hole diameter of the through hole. Moreover, the concave part has a shape in which the width in the first direction being the movement direction of the valve element is smaller than the width in the second direction orthogonal to the first direction. Thus, if the concave part is not a perfect circle in shape, but is long in shape in a direction orthogonal to the movement direction of the valve element, an area of a part overlapping with the opening part on the valve seat side can be secured while the concave part is small in width in the first direction. Therefore, the width in the first direction can be decreased as compared to a case where the perfect circular concave part is provided. Therefore, in the valve element, there is a sufficient space in the first direction, and thus, the degree of freedom in position of the concave part can be increased, and the degree of freedom in position of the through hole formed in the concave part can be also increased.

In the present invention, it is desirable that an edge of the concave part includes a straight line part located on either side of the through hole in the first direction. In this way, when the opening part on the valve seat side and the concave part partially overlap with each other, an overlapping part is formed in a shape cut off by a straight line. On the other hand, an overlapping part obtained when the concave part is circular is in a shape cut by an arc, and thus, the concave part having a shape including the straight line part can secure a larger overlapping area. That is, a large overlapping area can be secured even if the width of the concave part in the first direction is decreased. Therefore, the degree of freedom in position of the concave part and the through hole can be increased.

In the present invention, the valve element drive member rotates the valve element about a rotation axial line perpendicular to the valve seat surface, and the opening part is located on a movement trajectory of the through hole obtained when the valve element rotates about the rotation axial line. Therefore, a state in which the opening part is in communication with the through hole and a state in which the opening part is not in communication with the through hole can be switched by the rotation of the valve element. In such a configuration, it is desirable that the first direction is a circumferential direction around the rotation axial line, the second direction is a radial direction around the rotation axial line, and the concave part has a long hole shape in which a width in the circumferential direction is smaller than a width in the radial direction. As a result, even if there is a variation in rotational positions of the valve element, the fluid can be flowed at a flow rate corresponding to the hole diameter of the through hole. Moreover, even if the width in the circumferential direction of the concave part is small, the area of the part overlapping with the opening part on the valve seat side can be secured. Therefore, the degree of freedom in position of the concave part can be increased and the degree of freedom in position of the through hole formed in the concave part can be increased.

In the present invention, it is desirable that an outer shape of the valve element is circular around the rotation axial line and the through hole is circular. If the valve element is circular and the through hole is circular, the through hole may be provided at any position in the circumferential direction of the valve element. Therefore, the degree of freedom in position of the through hole is high.

In the present invention, it is desirable that a center in the radial direction of the concave part is closer to a rotation center of the valve element than an outer peripheral edge of the valve element. Thus, when the concave part is formed at a position near the rotation center of the valve element, a space on a side of the center of the valve element can be effectively utilized. Moreover, in the present invention, the width in the circumferential direction of the concave part can be decreased, and thus, the concave part can be arranged in a space on the side of the center of the valve element.

In the present invention, the through hole includes a plurality of through holes and the valve element is formed with the plurality of through holes, at least some of the plurality of through holes are different in hole diameter, and the concave part includes a plurality of concave parts and the abutment surface is formed with the plurality of concave parts corresponding to the plurality of through holes at positions spaced apart from one another. Further, if the valve element rotates about the rotation axial line perpendicular to the valve seat surface, the through hole includes a plurality of through holes and the plurality of through holes are arrayed in the circumferential direction around the rotation axial line, at least some of the plurality of through holes are different in hole diameter from one another, and the concave part includes a plurality of concave parts and the abutment surface is formed with the plurality of concave parts corresponding to the plurality of through holes at positions spaced apart from one another in the circumferential direction. In this way, when the valve element is moved (rotated), the hole diameters of the through holes in communication with the opening parts on the valve seat side can be switched. Therefore, the flow rate of the fluid can be adjusted. In addition, the valve element is provided with the concave part corresponding to the hole diameter of the through hole, even if the rotational position of the valve element is displaced, the fluid having a flow rate corresponding to the hole diameter of the through hole can be passed. Therefore, the accuracy of flow rate adjustment can be increased.

In the present invention, it is desirable that the valve element includes a flow channel groove formed on an opposite surface facing an opposite side of the abutment surface, and the through hole opens in a bottom surface of the flow channel groove. In this way, the through hole and the valve chamber can be communicated by way of a valve chamber side flow channel groove so that a length of the through hole can be shortened in the thickness direction of the valve element.

In the present invention, it is desirable that the opposite surface faces the valve element drive member, and the opposite surface is provided with a support surface abutting against with the valve element drive member. In this way, an inclination of the valve element can be regulated by the support surface, and thus, a sealing performance of the valve element can be improved.

In the present invention, the valve element is formed with a fitting concave part that fits with the valve element drive member, and the fitting concave part is connected to the flow channel groove. Thus, if the fitting concave part and the flow channel groove are formed continuously, it is possible to provide a good space efficiency when the fitting concave part and the flow channel groove are formed. Therefore, the degree of freedom in position where the fitting concave part and the flow channel groove are formed can be increased, and the degree of freedom in position of a penetration part opening in the bottom surface of the flow channel groove can be increased.

In the present invention, it is desirable that a depth of the concave part is greater than that of the hole diameter of the through hole. In this way, the depth of a flow channel in the concave part can be secured, and thus, it is possible to avoid a case where the flow rate is regulated when the fluid passes the concave part. Therefore, the fluid can be circulated at a flow rate corresponding to the hole diameter of the through hole.

In the present invention, it is desirable that the abutment surface is formed with a cutaway part at a position separated from the concave part, the cutaway part has a width in the first direction larger than a width in the first direction of the opening part and opens to an outer peripheral surface of the valve element. In this way, the fluid can be circulated at a flow rate determined based on an opening diameter of the opening part on the valve seat side.

In the present invention, it is desirable that the drive source is a stepping motor; the valve element drive member is a gear member having a tooth part formed on an outer peripheral surface of the valve element drive member, and a driving force of the drive source is transmitted to the valve element drive member where rotation from the drive source is decelerated. In this way, even if there is a variation in positions of the valve element, which cannot be eliminated by the regulation of the stepping motor, the fluid can be flowed at a flow rate corresponding to the hole diameter of the through hole.

Effect of the Invention

According to the present invention, when the valve element is moved, the through hole formed in the valve element and the opening part formed in the valve seat surface can be communicated. The valve element is formed with the concave part larger than the hole diameter of the through hole, and the through hole opens in the bottom surface of the concave part, and thus, even if there is a variation in positions of the valve element, the fluid can be flowed at a flow rate corresponding to the hole diameter of the through hole. Moreover, the concave part has a shape in which the width in the first direction being the movement direction of the valve element is smaller than the width in the second direction orthogonal to the first direction. As a result, even if the width in the first direction is small, the area of the part overlapping with the opening part on the valve seat side can be secured. Therefore, the width in the first direction can be decreased as compared to a case where the perfect circular concave part is provided. Therefore, in the valve element, there is a sufficient space in the first direction, and thus, the degree of freedom in position of the concave part can be increased, and the degree of freedom in position of the through hole formed in the concave part can be also increased.

MODE FOR CARRYING OUT THE INVENTION

An embodiment of a valve device to which the present invention is applied will be described with reference to the drawings below. The valve device according to the present embodiment is a refrigerant valve device provided between a compressor and a cooler in a refrigerant flow channel in a refrigerator and used for adjusting a flow rate of a refrigerant. It is noted that the valve device of the present invention is not limited in use to adjustment of a refrigerant flow rate, and can be applied to valve devices for other uses.

(Overall Configuration)

Figure 1A:
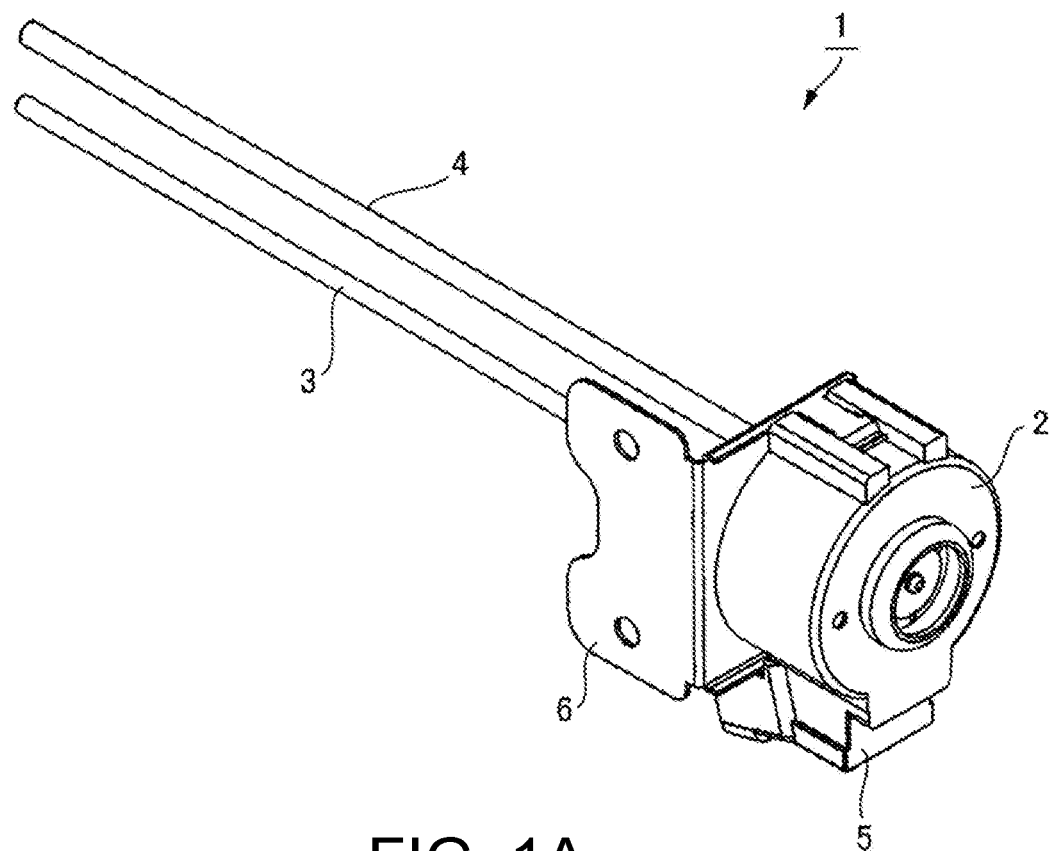
FIG. 1A and FIG. 1B are perspective views of a valve device to which the present invention is applied.
Figure 1B:
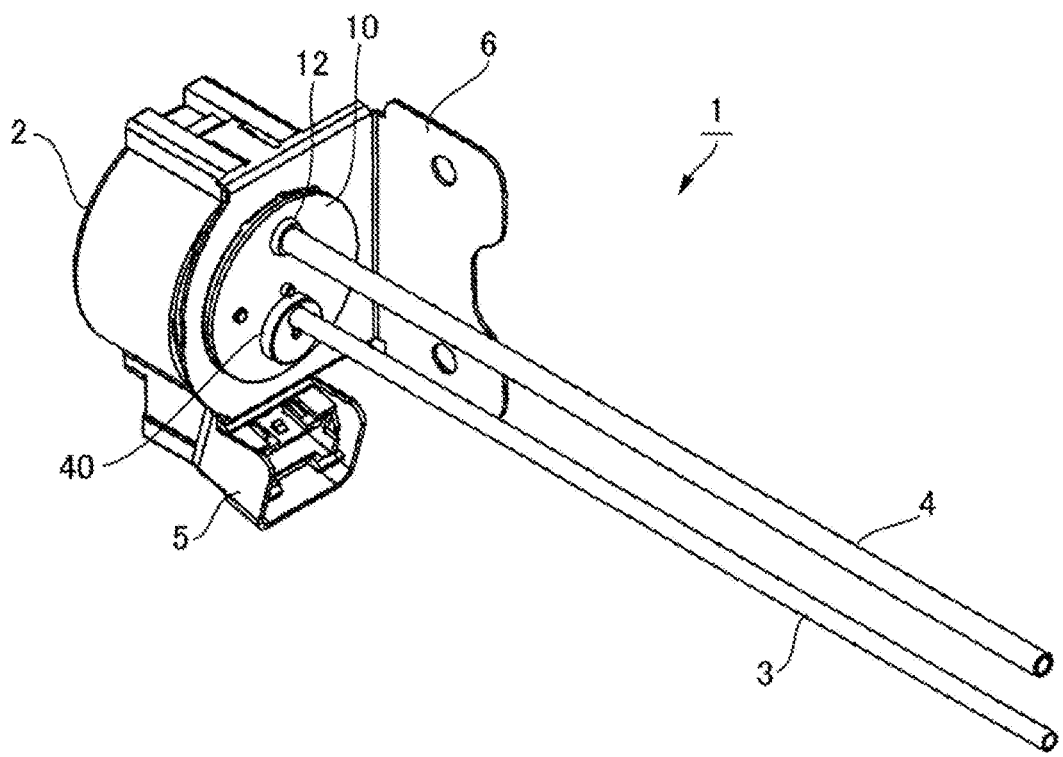
Figure 2:
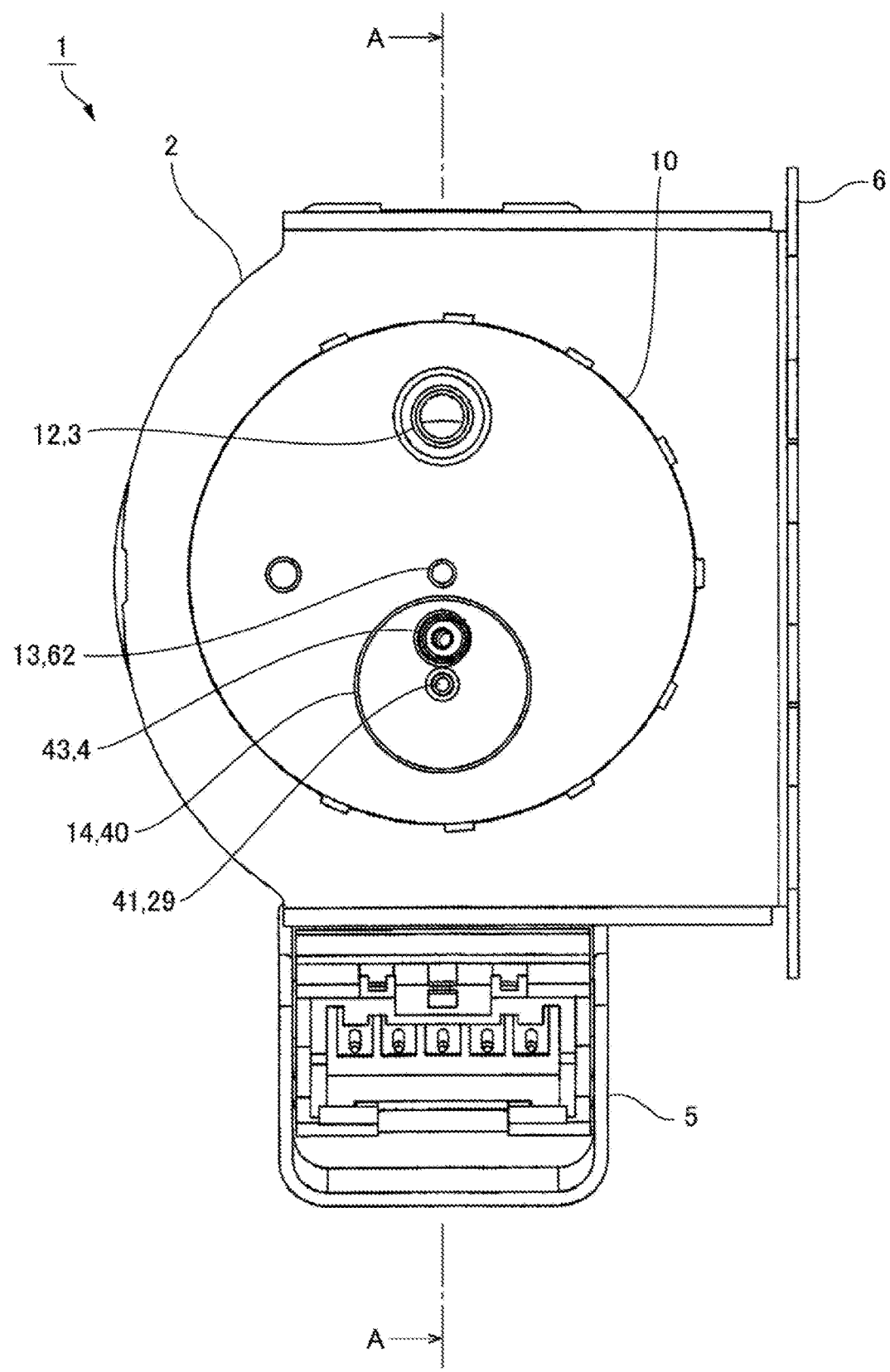
FIG. 2 is a bottom surface view of the valve device of FIG. 1A and FIG. 1B.

FIG. 1A and FIG. 1B are perspective views of a valve device to which the present invention is applied. FIG. 1A is a perspective view seen from a side of a valve main body, and FIG. 1B is a perspective view seen from a side of an inflow pipe and an outflow pipe. FIG. 2 is a bottom surface view of the valve device of FIG. 1A and FIG. 1B. A valve device 1 includes a valve main body 2, and an inflow pipe 3 and an outflow pipe 4 extending in parallel from the valve main body 2. The valve main body 2 includes a connector 5 that provides electric connection with an external control device, and a mounting plate 6 that mounts the valve device 1 in a refrigerator. It is noted that in the following description, for convenience, a direction in which the inflow pipe 3 and the outflow pipe 4 are extendedly provided will be referred to as an up-down direction, the valve main body 2 will be described as an upper side, and the inflow pipe 3 and the outflow pipe 4 will be described as a lower side.

Figure 3:
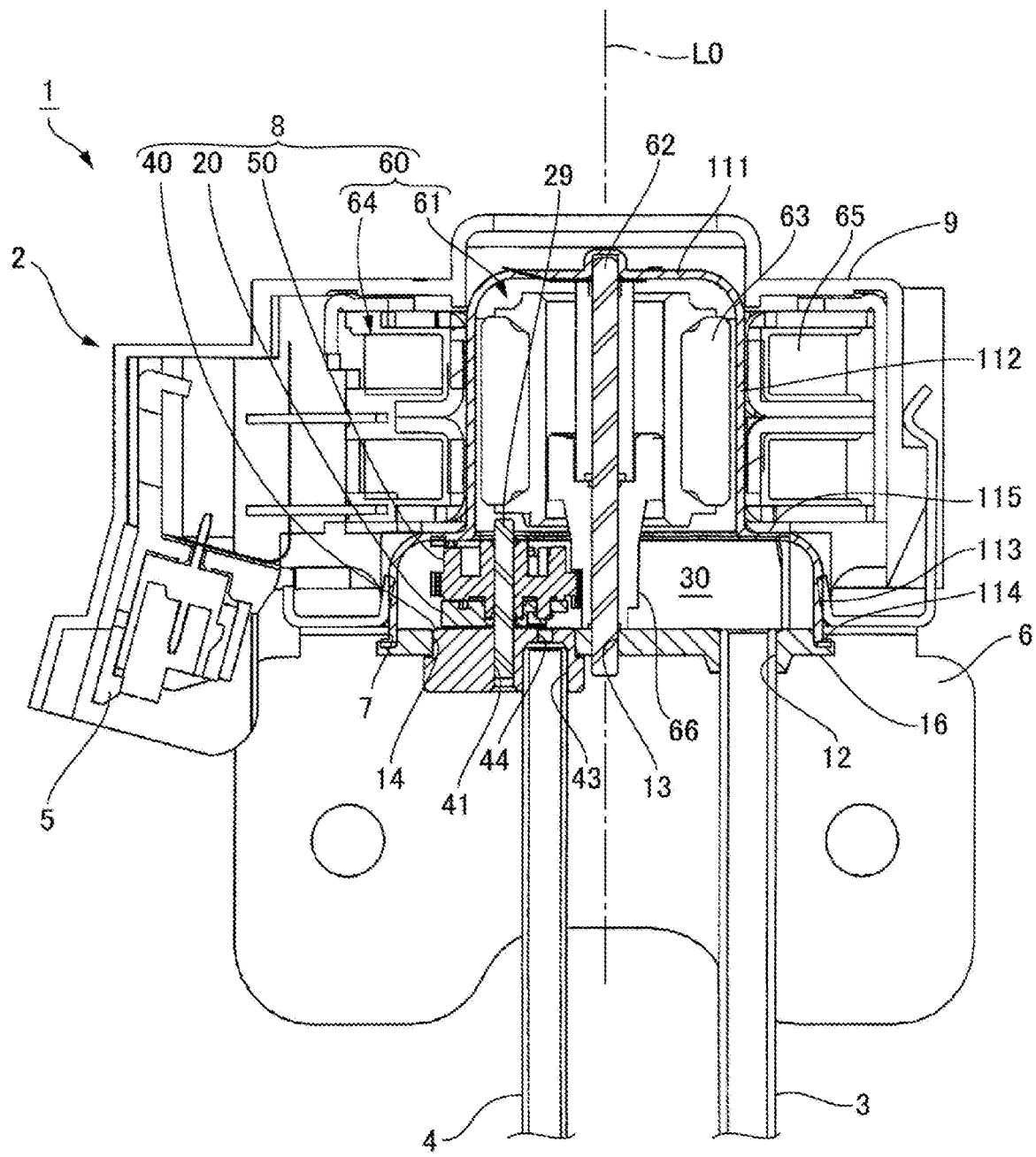
FIG. 3 is a sectional view of the valve device of FIG. 1A and FIG. 1B (a sectional view taken along line A-A in FIG. 2).

FIG. 3 is a cross-sectional view of the valve device 1 (cross-sectional view taken along line A-A in FIG. 2). The valve main body 2 includes an exterior case 9 covering the upper side of the mounting plate 6. Inside the exterior case 9, a cup-shaped sealing cover 11 is arranged in a disk-shaped base 10 covered from above. The sealing cover 11 is fitted from below into a circular opening part 7 formed in the mounting plate 6. The base 10 is exposed on a bottom surface of the valve device 1.

In a center of the base 10, a shaft hole 13 that rotatably supports a rotor support shaft 62 of a stepping motor 60 described later is formed. Further, a refrigerant inlet 12 that makes connection of the inflow pipe 3 is formed at a position near an outer periphery of the base 10, and a valve seat attachment hole 14 or circular opening part is provided on the opposite side of the refrigerant inlet 12 across the shaft hole 13. A circular valve seat 40 is fitted in the valve seat attachment hole 14. The valve seat 40 is exposed on the bottom surface of the valve device 1, and the outflow pipe 4 is connected to a refrigerant outlet 43 formed in the valve seat 40. Further, a base-side flange 16 (see FIG. 3) that has a plate thickness thinner than that of a center part of the base 10 is formed on an outer peripheral edge of the base 10.

The sealing cover 11 is formed by pressing a nonmagnetic stainless steel plate. As illustrated in FIG. 3, the sealing cover 11 includes, from an upper direction to a lower direction, a circular bottom part 111, a small-diameter cylindrical part 112 that extends downward from an outer peripheral edge of the bottom part 111, a large-diameter cylindrical part 113 that has a larger diameter than the small-diameter cylindrical part 112, and a cover-side flange 114 that expands radially outward from a lower end edge (opening edge) of the large-diameter cylindrical part 113. The small-diameter cylindrical part 112 and the large-diameter cylindrical part 113 are connected via an annular part 115 set perpendicular to an axis L0 that passes through the center of the base 10. The sealing cover 11 is fixed to the base 10 with the cover-side flange 114 that abuts against the base-side flange 16. Between the sealing cover 11 and the base 10, a valve chamber 30 being a flow channel in which the refrigerant is stored is formed.

The valve device 1 includes a flow rate adjustment mechanism 8 that adjusts the flow rate of fluid (refrigerant) that flows from the valve chamber 30 to the outflow pipe 4. The flow rate adjustment mechanism 8 includes the stepping motor 60 being a drive source. The stepping motor 60 includes a rotor 61 arranged inside the sealing cover 11 and a stator 64 configured between the sealing cover 11 and the exterior case 9. The rotor 61 includes a permanent magnet 63 arranged on an outer peripheral surface thereof, and is rotatably supported by the rotor support shaft 62. The rotor support shaft 62 has an upper end thereof fixed to the bottom part 111 of the sealing cover 11 and a lower end thereof fixed to the center of the base 10. An axis of the rotor support shaft 62 coincides with the axis L0 that passes through the center of the base 10 and extends in parallel with an axis L of a support shaft 29 that rotatably supports a valve element drive member 50 and a valve element 20 described later. A pinion 66 that rotates together with the rotor 61 is formed at a lower end of the rotor 61. The pinion 66 is arranged in the valve chamber 30.

The stator 64 is supported by the annular part 115 of the sealing cover 11 from below and is arranged on an outer peripheral side of the small-diameter cylindrical part 112 of the sealing cover 11. The stator 64 includes a coil 65, and the coil 65 faces the permanent magnet 63 of the rotor 61 through the small-diameter cylindrical part 112 of the sealing cover 11. The coil 65 is electrically connected to the connector 5. An operation of the stepping motor 60 is controlled by an external control device connected via the connector 5.

(Flow Rate Adjustment Mechanism)

Figure 4:
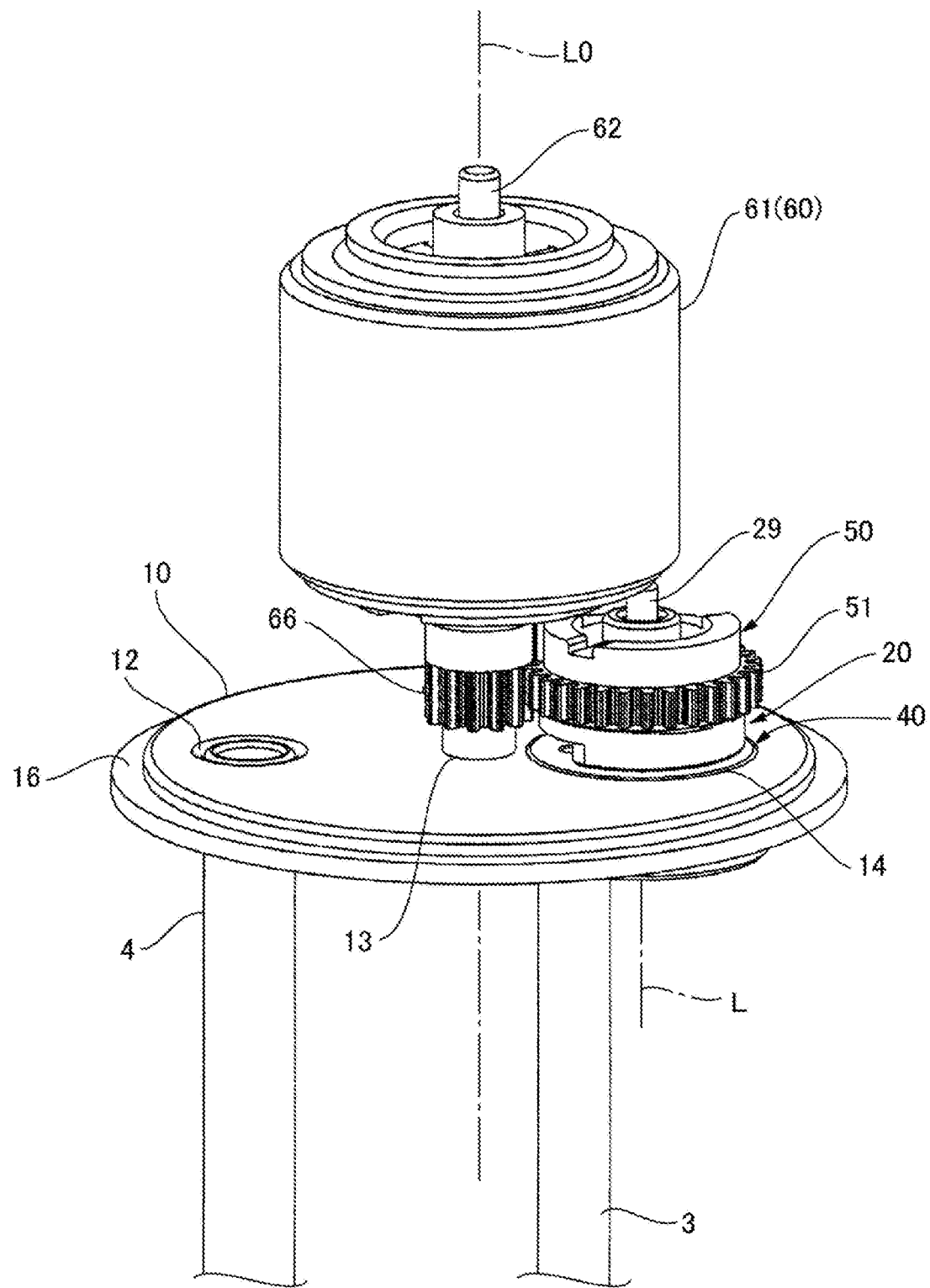
FIG. 4 is a perspective view illustrating a main part of a flow rate adjustment mechanism.
Figure 5A:
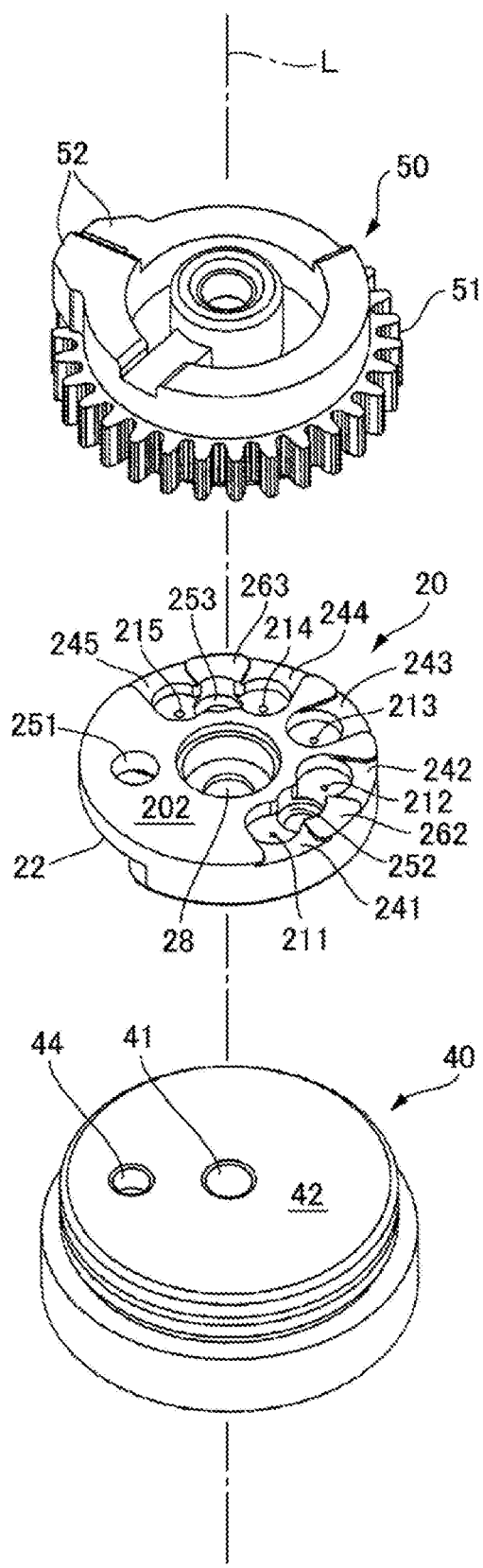
FIG. 5A and FIG. 5B are exploded perspective views of a valve element drive member, a valve element, and a valve seat.
Figure 5B:
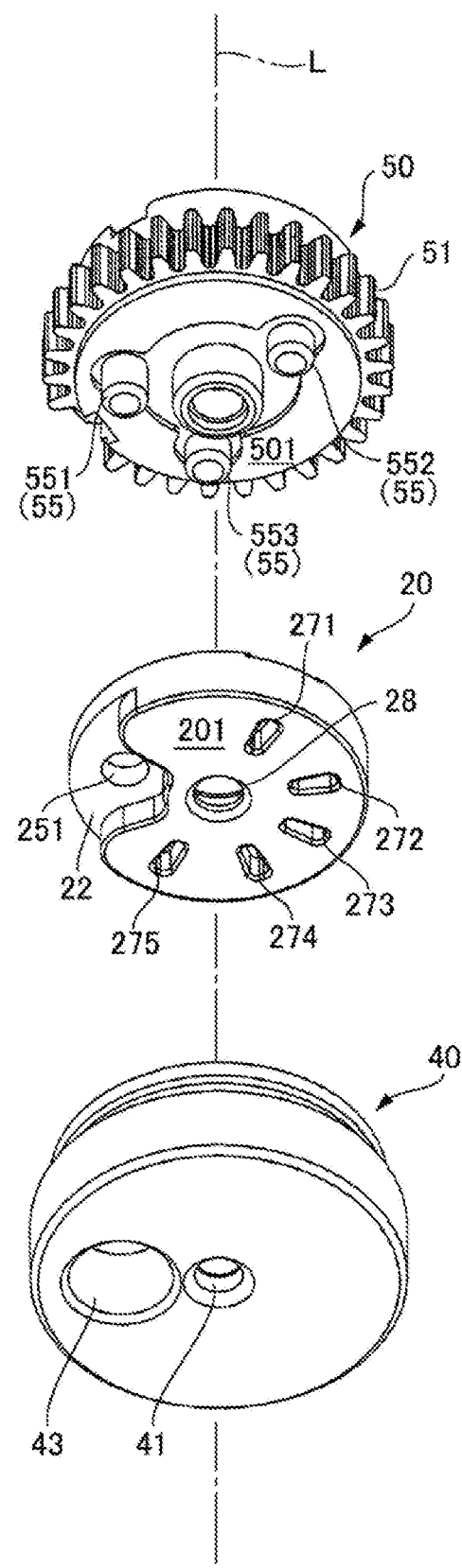

FIG. 4 is a perspective view illustrating a main part of the flow rate adjustment mechanism 8. FIG. 5A and FIG. 5B are exploded perspective views of the valve element drive member 50, the valve element 20, and the valve seat 40, where FIG. 5A is a perspective view seen from an upper side and FIG. 5B is a perspective view seen from a lower side. The flow rate adjustment mechanism 8 includes the stepping motor 60 being a drive source, the valve element drive member 50, the valve element 20, and the valve seat 40. The valve element drive member 50, the valve element 20, and the valve seat 40 are arranged in this order from the upper direction to the lower direction centered around the support shaft 29 that extends in the up-down direction along the axis L that runs parallel to the axis L0 of the stepping motor 60. The valve seat 40 is circular, and a shaft hole 41 to which the support shaft 29 is fixed is formed at a center of the valve seat 40. The valve element drive member 50 and the valve element 20 are rotatably supported on the support shaft 29.

The valve element drive member 50 is a gear member having a tooth part 51 formed on an outer peripheral surface of the valve element drive member 50, and the tooth part 51 meshes with the pinion 66 of the stepping motor 60. The rotation of the stepping motor 60 is decelerated via the pinion 66 and the tooth part 51, and then, transmitted to the valve element drive member 50. The valve element drive member 50 of the present embodiment is a gear member provided with the tooth part 51. Therefore, it is not necessary to provide a component for configuring a speed reduction mechanism, so that the number of components of the flow rate adjustment mechanism can be reduced. Therefore, it is advantageous for downsizing the valve device 1.

As illustrated in FIG. 5A, the valve element drive member 50 is formed with an arm part 52 that protrudes radially outward from a part of the valve element drive member 50 in the circumferential direction. When the valve element drive member 50 rotates to reach a predetermined angular position, the arm part 52 abuts from one side or the other side around the axis L against a rotation restricting part (not illustrated) provided in the rotor 61 to limit a rotation angle of the valve element drive member 50 and the valve element 20 to a predetermined range.

As illustrated in FIG. 5B, the valve element drive member 50 includes a flat lower end surface 501 orthogonal to the axis L of the support shaft 29. The lower end surface 501 faces the valve element 20. On the lower end surface 501, convex parts 551, 552, and 553 being fitting parts projecting toward the valve element 20, are formed. The convex parts 551, 552, and 553 are arranged at unequal intervals along the circumferential direction of the valve element drive member 50. Hereinafter, these three convex parts are collectively referred to as "convex parts 55". Among end surfaces of the valve element 20, on an upper end surface 202 facing the valve element drive member 50, at positions corresponding to the convex parts 55 of the valve element drive member 50, concave parts 251, 252, and 253 being fitting parts into which the convex parts 55 are fitted, are formed. Hereinafter, these three concave parts are collectively referred to as "concave parts 25". When these plurality of sets of fitting parts (the convex parts 55 and the concave parts 25) are fitted, the valve element 20 is integrated with the valve element drive member 50 and rotates in the circumferential direction. In addition, when the plurality of sets of fitting parts are arranged at unequal intervals along the circumferential direction of the valve element drive member 50 and the valve element 20, it is possible to prevent a case where the valve element drive member 50 and the valve element 20 are incorrectly assembled. It is noted that convex and concave directions of the convex parts 55 and the concave parts 25 may be reversed. In other words, the valve element drive member 50 may be formed with a concave part, and the valve element 20 may be formed with a convex part to fit into the concave part of the valve element drive member 50.

An outer shape of the valve element 20 is a circle centered around the axis L. The valve element 20 includes a flat lower end surface 201 orthogonal to the axis L of the support shaft 29. The lower end surface 201 faces the valve seat 40. The lower end surface 201 is formed with a cutaway part 22 cut radially inward from the outer peripheral surface of the valve element 20. The cutaway part 22 is formed at a position spaced apart in the circumferential direction from a flow channel securing groove 27 described later. Of the concave parts 25 formed in the valve element 20, a concave part 251 is a through hole that penetrates to a side of the cutaway part 22. A distal end part of a convex part 551 fitted into the concave part 251 is exposed to the side of the cutaway part 22 and the distal end part of the convex part 551 is caulked on the side of the cutaway part 22. As a result, the valve element 20 is fixed, without rattling, to the lower end surface 501 of the valve element drive member 50. Therefore, the valve element drive member 50 can highly accurately control an angular position of the valve element 20.

The valve seat 40 is arranged below the valve element 20 and is fitted into the valve seat attachment hole 14 formed in the base 10. The valve seat 40 is a substantially cylindrical member, and on the upper surface thereof, a valve seat surface 42 is provided. The valve seat surface 42 is a circular plane orthogonal to the axis L. The valve seat 40 is formed with the refrigerant outlet 43 that penetrates the valve seat 40 at a position deviated radially outward from the axis L. An upper end of the refrigerant outlet 43 is an outlet 44 being an opening part that is provided in the valve seat surface 42.

The valve element 20 is a disk-shaped member and is placed on the valve seat 40. The lower end surface 201 of the valve element 20 is an abutment surface abutting against the valve seat surface 42. Moreover, the upper end surface 202 of the valve element 20 is an opposite surface facing an opposite side of the lower end surface 201 being the abutment surface. When the valve element drive member 50 is rotated by a driving force of the stepping motor 60, the valve element 20 rotates together with the valve element drive member 50, and the lower end surface 201 (abutment surface) of the valve element 20 relatively rotates, while sliding with the valve seat surface 42, relative to the valve seat surface 42. As a result, a state where the outlet 44 formed in the valve seat surface 42 is closed by a flat surface part of the lower end surface 201 of the valve element 20 and a state where the outlet 44 communicates with the valve chamber 30 are switched.

The lower end surface 201 of the valve element 20 and the valve seat surface 42 of the valve seat 40 are polished to be a flat surface. This enhances a sealing performance of the lower end surface 201 of the valve element 20 and the valve seat surface 42, and as a result, it is possible to prevent the refrigerant from leaking from a gap between a contact surface between the valve element 20 and the valve seat surface 42. Further, when the valve element drive member 50 and the valve element 20 are fixed, the distal end part of the convex part 551 is caulked by the cutaway part 22, and thus, abrasion and deformation caused by caulking work on the lower end surface 201 of the polished valve element 20 can be prevented. It is noted that in the present embodiment, both the lower end surface 201 of the valve element 20 and the valve seat surface 42 of the valve seat 40 are polished; however, even if only one of the surfaces is polished, an equivalent leakage prevention effect is obtained.

(Valve Element)

Figure 6A:
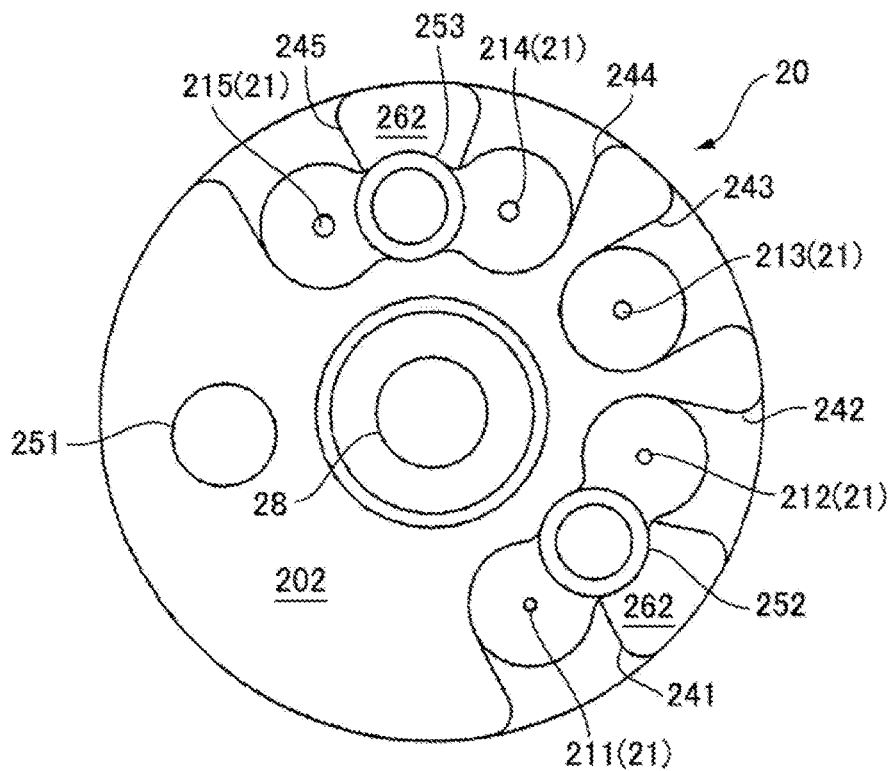
FIG. 6A is a top surface view of the valve element.
Figure 6B:
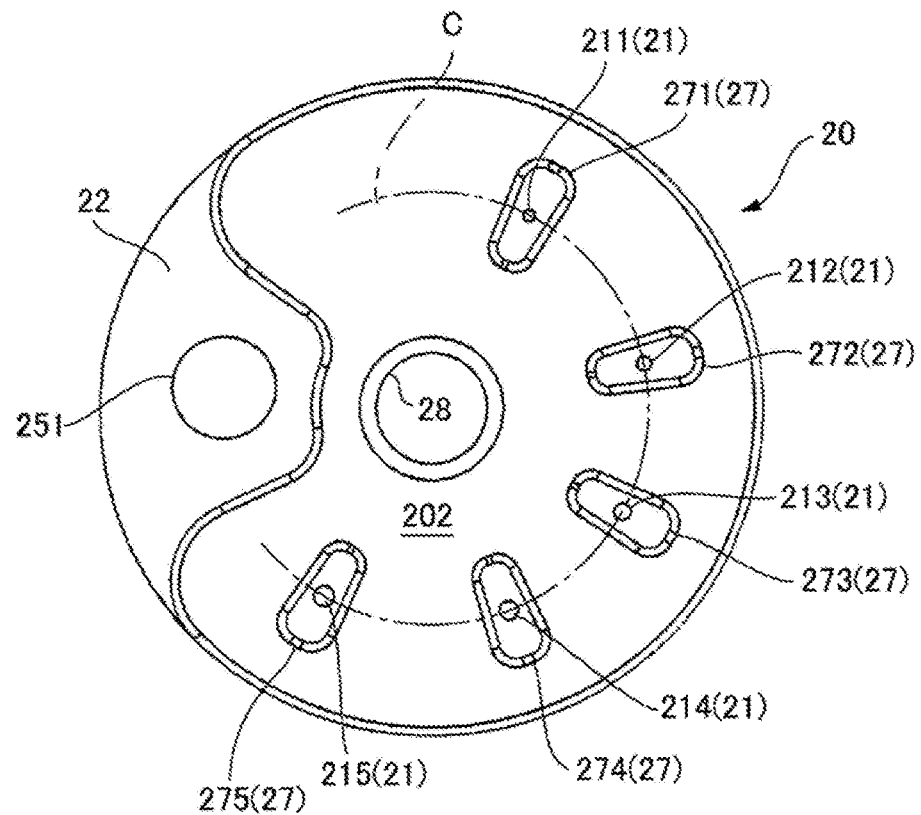
FIG. 6B is a bottom surface view of the valve element.

FIG. 6A is a top surface view of the valve element 20, and FIG. 6B is a bottom surface view of the valve element 20. The valve element 20 is formed with five through holes 211, 212, 213, 214, and 215 that penetrate the valve element 20 in an axis L direction. Hereinafter, these five through holes are collectively referred to as "through holes 21" (see FIG. 6B). Each of the through holes 21 has a smaller diameter than that of the outlet 44 formed in the valve seat surface 42. The hole diameters of the five through holes 21 are progressively increased so that the hole diameter of the through hole 211 is the smallest and the hole diameter of the through hole 215 is the largest. The valve element 20 of the present embodiment includes a plurality of through holes 21 that has different hole diameters. Therefore, when the valve element 20 is rotated, the flow rate can be adjusted by switching the through hole 21 that communicates with the outlet 44 formed in the valve seat surface 42. It is noted that the hole diameters of the through holes 211, 212, 213, 214, and 215 can be appropriately changed according to a usage method of the valve device 1. For example, the order of the hole diameters of the through holes 211, 212, 213, 214, and 215 may be differed from the above example.

On the lower end surface 201 of the valve element 20, the cutaway part 22 recessed upward is formed. The cutaway part 22 is a refrigerant flow channel through which the refrigerant flows. The cutaway part 22 has a size allowing a whole of the outlet 44 of the valve seat surface 42 to be exposed when the valve element 20 is at a predetermined angular position. That is, the cutaway part 22 has a larger width in the circumferential direction than the outlet 44, and is configured such that the lower end surface 201 of the valve element 20 does not contact the outlet 44 when the valve element 20 is at a predetermined angular position. When the whole of the outlet 44 is exposed in the cutaway part 22, the flow rate of the refrigerant reaches a maximum flow rate.

On the upper end surface 202 (opposite surface) of the valve element 20, flow channel grooves 241, 242, 243, 244, and 245 are formed which are cut off radially inward from the outer peripheral surface of the valve element 20. Hereinafter, these five grooves are collectively referred to as "flow channel grooves 24". Each of the flow channel grooves 24 is a refrigerant flow channel connected to the through hole 21. On the upper end surface 202 of the valve element 20, the concave part 252 is formed between the flow channel groove 241 and the flow channel groove 242 and is in communication with the flow channel groove 241 and the flow channel groove 242 in the circumferential direction. Similarly, a concave part 253 is formed between the flow channel groove 244 and the flow channel groove 245 and is in communication with the flow channel groove 244 and the flow channel groove 245 in the circumferential direction. As described above, the concave parts 252 and 253 are continuous with the flow channel grooves on both sides thereof in the circumferential direction, and thus, a wide space for providing the through hole 21 is secured.

On the upper end surface 202 of the valve element 20, support surfaces 262 and 263 abutting against the lower end surface 501 of the valve element drive member 50 are provided on radially outer sides of the concave parts 252 and 253. The support surfaces 262 and 263 are provided on an outer peripheral part farthest from the center of the valve element 20. The support surfaces 262 and 263 are located on the same plane as other parts of the upper end surface 202 of the valve element 20. The support surfaces 262 and 263 abut against the lower end surface 501 of the valve element drive member 50 to restrict an inclination of the valve element 20.

The five through holes 21 are arranged on an arc having the same diameter with respect to a radial center of the valve element 20. A movement trajectory C (see FIG. 6(b) FIG. 6B) of the through hole 21 obtained when the valve element 20 rotates about the axis L passes through a center of the outlet 44 formed in the valve seat surface 42. Further, the five through holes 21 are located in an approximately middle between the radial center of the valve element 20 and the outer peripheral edge of the valve element 20. Accordingly, it is possible to have a sufficient space on a radially outer side and a radially inner side of the through hole 21, and thus, the sealing performance between the valve element 20 and the valve seat surface 42 can be enhanced on both sides of the through hole 21 in the radial direction. In addition, it is possible to have a sufficient space on a radially outer side of the concave parts 252 and 253 between the valve element 20 and the valve element drive member 50, and thus, the support surfaces 262 and 263 can be provided on the radially outer side of the concave parts 252 and 253. Therefore, the inclination of the valve element 20 can be prevented and the sealing performance can be enhanced.

The valve element 20 is made of polyphenylene sulfide resin, and the valve element drive member 50 is made of nylon resin. Polyphenylene sulfide resin has high moldability and excellent wear resistance. Since the valve element drive member 50 does not require molding accuracy as high as that of the valve element 20, an increase in cost can be suppressed by using an inexpensive nylon resin.

(Flow Channel Securing Groove)

The valve element 20 rotates about the support shaft 29, based on the rotation of the valve element drive member 50. That is, the axis L that passes through the center of the support shaft 29 is a rotation axial line of the valve element 20. Further, the circumferential direction centered around the axis L is a moving direction (rotating direction) of the valve element 20 relative to the valve seat surface 42. Hereinafter, the circumferential direction centered around the axis L is referred to as a first direction X. Further, a radial direction centered around the axis L is referred to as a second direction Y. In the present embodiment, to ensure that the refrigerant of the valve chamber 30 flows out to the outflow pipe 4, the valve seat 40 fitted to the base 10 is formed with the refrigerant outlet 43 that penetrates the valve seat 40 in the axis L direction, and the outflow pipe 4 is connected to a lower end of the refrigerant outlet 43. The valve seat surface 42 being an upper end surface of the valve seat 40 is a plane orthogonal to the axis L, and is exposed internally of the valve chamber 30. The valve seat surface 42 is formed with the outlet 44 being an opening part provided at the upper end of the refrigerant outlet 43. It is noted that in the valve device 1 according to the present embodiment, the valve seat 40 is attached to a location with which the outflow pipe 4 is connected, out of the inflow pipe 3 and the outflow pipe 4, but an inflow side and an outflow side may be reversed. That is, the valve seat 40 may be attached to a location with which the inflow pipe 3 is connected, and the outlet 44 may be used as an inlet.

The flow rate adjustment mechanism 8 controls a rotational position of the valve element 20 by driving the valve element drive member 50 to switch the through holes 21 that communicates with the outlet 44 so that the flow rate of the fluid (refrigerant) is adjusted. Further, the rotational position of the valve element 20 is controlled to switch among a flow rate adjustment mode in which the outlet 44 communicates with any of the through holes 21, a maximum flow rate mode in which the valve chamber 30 and the outlet 44 communicate without passing through the through hole 21, and a supply stop mode in which the outlet 44 is closed by the valve element 20.

The lower end surface 201 of the valve element 20 is an abutment surface abutting against the valve seat surface 42 formed thereon with the outlet 44 in the axis L direction. In the lower end surface 201, lower ends of the five through holes 21 described above are opened. In the present embodiment, to ensure that the through holes 21 and the outlet 44 are in communication even if there is a variation in the rotational position of the valve element 20, flow channel securing grooves 271, 272, 273, 274, and 275 being concave parts larger than the hole diameters of the through holes 21 are formed on the lower end surface 201 of the valve element 20. The flow channel securing groove 271, 272, 273, 274, and 275 are concave parts recessed upward from the lower end surface 201. Each of the through holes 21 opens on the bottom surface of each of the flow channel securing grooves 271, 272, 273, 274 and 275. Hereinafter, these five flow channel securing grooves are collectively referred to as "flow channel securing grooves 27" (see FIG. 6(*b*) FIG. 6B).

Figure 7:
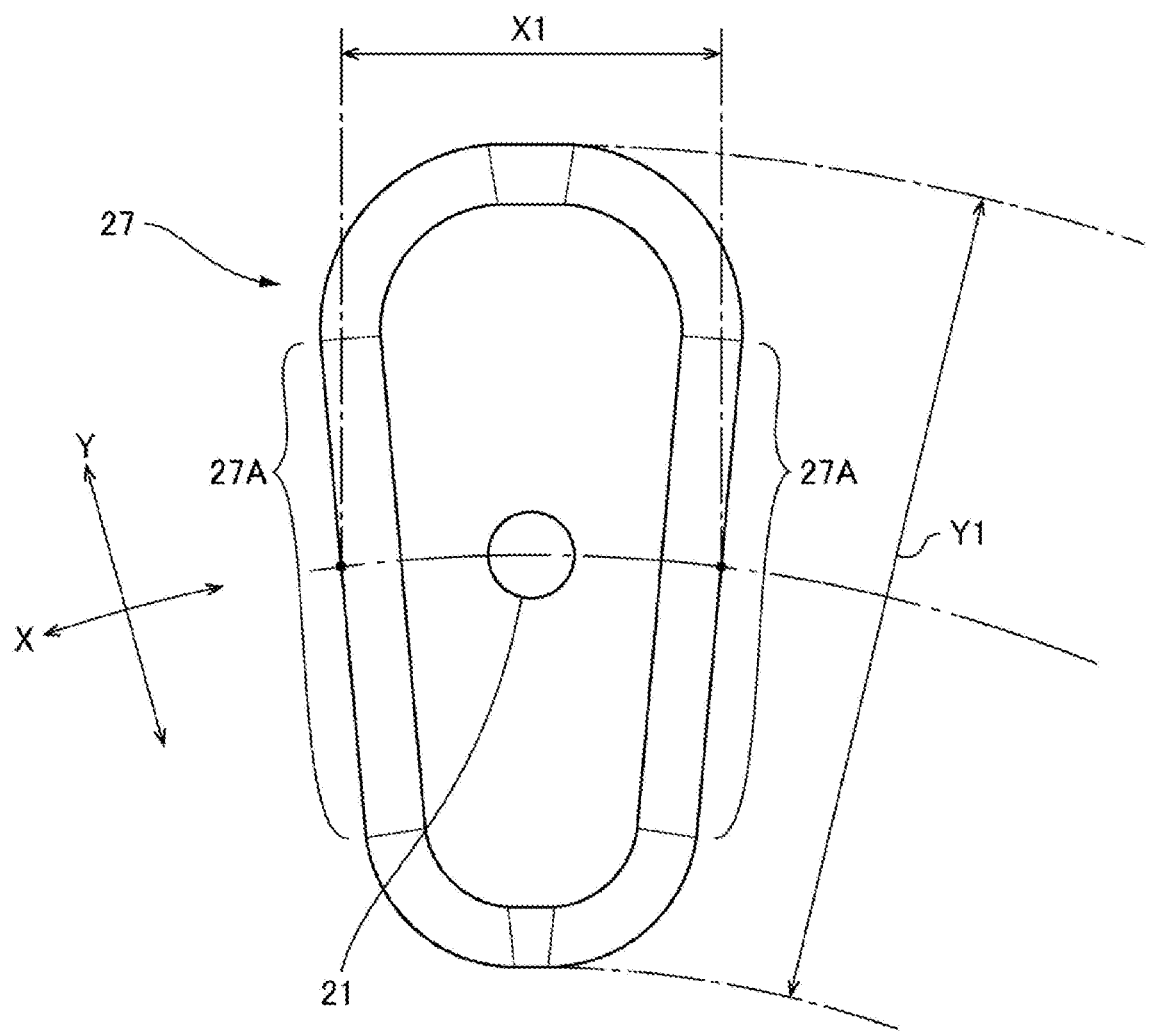
FIG. 7 is an explanatory diagram of a penetration part and a flow channel securing groove.

FIG. 7 is an explanatory diagram of the through holes 21 and the flow channel securing grooves 27. As illustrated in FIG. 7, the through hole 21 is arranged at a center in the first direction X (circumferential direction) of the flow channel securing groove 27 and at a center in the second direction Y (radial direction) of the flow channel securing groove 27. In the flow channel securing groove 27, a width X1 in the first direction X and a width Y1 in the second direction Y are larger than the hole diameter of the through hole 21. Further, in the flow channel securing groove 27, the width X1 in the first direction X, which is the moving direction of the valve element 20, is smaller than the width Y1 in the second direction Y orthogonal to the first direction X. That is, the flow channel securing groove 27 has a long hole shape elongated in a direction orthogonal to the moving direction of the valve element 20 (radial direction).

An edge of the flow channel securing groove 27 includes a straight line part 27A located on either side of the through hole 21 in the first direction X (that is, either side of the through hole 21 in the circumferential direction). The straight line part 27A extends in the second direction Y. Thus, the flow channel securing groove 27 has a shape in which a circumferential width increases toward a radially outer side. In addition, a radially outer edge and a radially inner edge of the flow channel securing groove 27 have an arc shape centered around the axis L located at a rotation center of the valve element 20.

Thus, as a result of the through hole 21 being formed at the bottom part of the flow channel securing groove 27 larger than the hole diameter of the through hole 21, a decrease in the flow rate due to the displacement of the rotational position of the valve element 20 is suppressed. That is, even in a case where the through hole 21 partially overlaps with the outlet 44 as a result of the rotational position of the valve element 20 being displaced from a design location due to a component tolerance or the like, or as long as an overlapping area between the flow channel securing groove 27 that communicates with the through hole 21 and the outlet 44 is larger than a cross-sectional area of the through hole 21 even if the through hole 21 does not completely overlap with the outlet 44, a refrigerant that has a flow rate corresponding to the hole diameter of the through hole 21 can be flowed. Therefore, the accuracy of flow rate adjustment by the through hole 21 can be enhanced.

A depth of the flow channel securing groove 27 is deeper than the hole diameter of the corresponding through hole 21. Therefore, it is designed so that the flow rate passing through the flow channel securing groove 27 does not fall below the flow rate that passes through the through hole 21, and therefore, the flow rate of the through hole 21 is not limited by the flow channel securing groove 27. It is noted that in the present embodiment, the hole diameter of the flow channel securing groove 27 is constant, but the hole diameter need not be constant. An inner peripheral surface of the flow channel securing groove 27 may have a shape in which the hole diameter increases as a distance from the through hole 21 increases. For example, the inner peripheral surface of the flow channel securing groove 27 can be tapered.

Figure 8A:
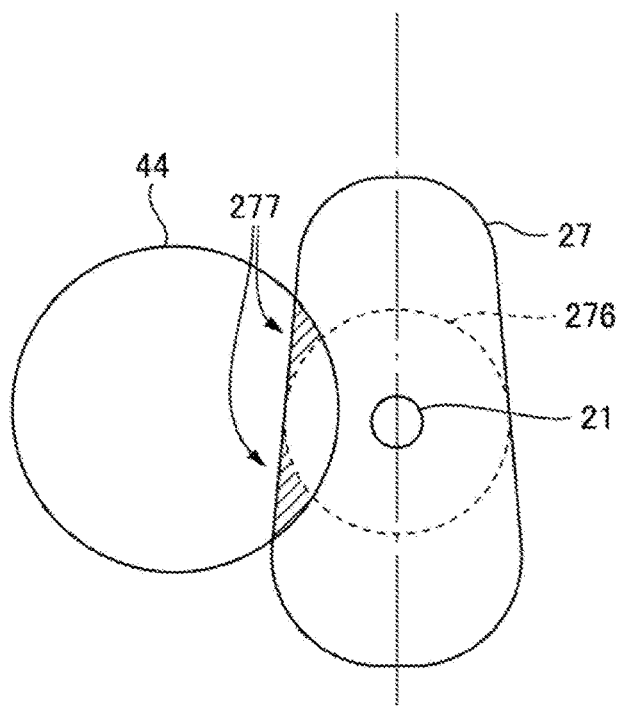
FIG. 8A and FIG. 8B are explanatory diagrams illustrating an overlap between the flow channel securing groove and an outlet.
Figure 8B:
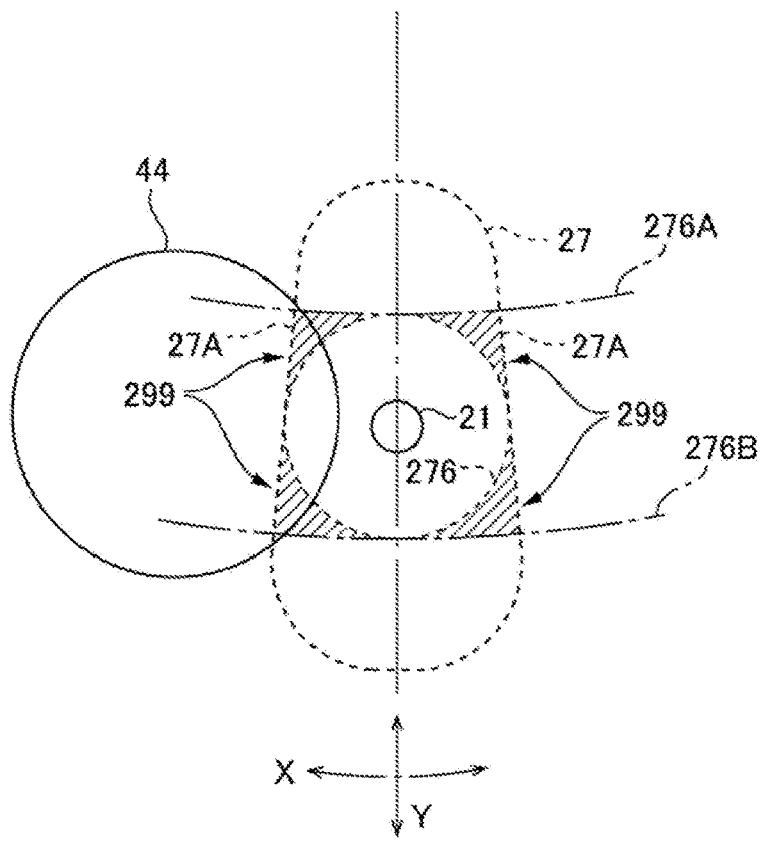

FIG. 8A and FIG. 8B are explanatory diagrams each illustrating an overlap between the flow channel securing groove 27 and the outlet 44. FIG. 8A and FIG. 8B schematically illustrate a shape of the flow channel securing groove 27 of the present embodiment and a shape of a circular flow channel securing groove 276 identical in width in the first direction X to the flow channel securing groove 27. Since the flow channel securing groove 27 of the present embodiment has a long hole shape in which the width in the second direction Y orthogonal to the first direction X is longer than a dimension in the first direction X, edges on both sides in the first direction X are linear. It is noted that the edges on the both sides of the flow channel securing groove 27 in the first direction X may not need be linear. For example, it may suffice that the edges on the both sides have a substantially straighter line shape than the edge of the circular flow channel securing groove 276, and the edges on the both sides may be a curved line. For example, the flow channel securing groove 27 may have an oval shape long in the second direction Y. As described above, if the edge in the first direction X is linear or resembles a straight line rather than an arc, an overlapping region of the flow channel securing groove 27 and the outlet 44 includes an overlapping region 277 illustrated by hatching in FIG. 8A. On the other hand, the overlapping area of the circular flow channel securing groove 276 and the outlet 44 does not include the overlapping region 277 illustrated by hatching in FIG. 8A and FIG. 8B. That is, the flow channel securing groove 27 of the present embodiment has a larger region overlapping with the outlet 44 than the circular flow channel securing groove 276 if the flow channel securing groove 27 coincides in displacement of the rotational position with the outlet 44.

Thus, in addition to a shape for ensuring the same overlapping area as the cross sectional area of the through hole 21, the flow channel securing groove 27 of the present embodiment has a smaller width in the first direction X (circumferential direction) than the circular flow channel securing groove 276. Therefore, it is possible to more effectively utilize a space of the lower end surface 201 of the valve element 20 than a case where the circular flow channel securing groove 276 is formed, and it is possible to increase the degree of freedom of arranging the flow channel securing groove 27 and the through hole 21. Therefore, the number of flow channel securing grooves 27 and through holes 21 that can be formed in the lower end surface 201 of the valve element 20 can be maximized. Specifically, it is possible to arrange the flow channel securing grooves 27 with a sufficient space in the circumferential direction, and thus, the number of flow channel securing grooves 27 and through holes 21 that can be arrayed in the circumferential direction can be maximized. Further, the flow channel securing grooves 27 can be arranged apart from one another in the circumferential direction. Accordingly, the sealing performance among the adjacent flow channel securing grooves 27 can be improved.

Arcs 276A and 276B illustrated in FIG. 8B are movement trajectories of the circular flow channel securing groove 276 obtained when the valve element 20 rotates about the axis L. The flow channel securing groove to which the present invention is applied may include, as a region overlapping with the outlet 44, a part of a region 299 (region indicated by hatching in FIG. 8B) defined by a radial straight line centered around the axis L (straight line that overlaps with the straight line part 27A), an outer shape of the circular flow channel securing groove 276, and the arcs 276A and 276B indicating the movement trajectory of the circular flow channel securing groove 276, and may suffice to have a shape in which the width in the second direction Y is larger than the width in the first direction X. With such a shape, if the displacement in rotational position from the outlet 44 is the same, an overlap with the outlet 44 can be made larger than the circular flow channel securing groove 276. Therefore, an operation and effect similar to those of the flow channel securing groove 27 of the present embodiment can be obtained.

In the present embodiment, the displacement of the rotational position of the valve element 20 due to component tolerances or the like can be kept within approximately eight steps in terms of the number of driving steps of the stepping motor 60. Therefore, as a result of simulation of an area that overlaps between the flow channel securing groove 27 and the outlet 44 if the rotational position of the valve element 20 was displaced by eight steps where the valve element 20 had a diameter of 8 mm, in the circular flow channel securing groove 276, if the width in the first direction X of the flow channel securing groove 276 was 0.36 mm, an area that overlaps between the outlet 44 and the flow channel securing groove 276 was made identical to the cross-sectional area of the through hole 21. On the other hand, when the shape of the flow channel securing groove 27 of the present embodiment was adopted, if the width in the first direction X of the flow channel securing groove 27 was 0.26 mm, an area that overlaps between the outlet 44 and the flow channel securing groove 276 was made identical to the cross-sectional area of the through hole 21. That is, the flow channel securing groove 27 of the present embodiment provides a result that the width in the first direction X (circumferential direction) can be reduced.

It is noted that in the present embodiment, the widths of the five flow channel securing grooves 27 in the first direction X (circumferential direction) are all the same. Specifically, the shape of the flow channel securing groove 27 was determined in accordance with the flow channel securing groove 27 that has the largest hole diameter. Here, the width of the flow channel securing groove 27 in the first direction X (circumferential direction) can be set to a width corresponding to the hole diameter of the corresponding through hole 21. That is, the through hole 21 that has a small hole diameter can be formed in the flow channel securing groove 27 that has a small circumferential width, and the through hole 21 that has a large hole diameter can be formed in the flow channel securing groove 27 that has a large circumferential width. In this way, the space of the lower end surface 201 of the valve element 20 can be used effectively, and the number of the flow channel securing grooves 27 that can be formed in the lower end surface 201 can be maximized.

Further, in the present embodiment, the center in the second direction Y of the flow channel securing groove 27 is located near the radial center of the valve element 20, but the flow channel securing groove 27 can be formed at a location where the center in the second direction Y of the flow channel securing groove 27 is closer to the center of the valve element 20 than the outer peripheral edge of the valve element 20. If the flow channel securing groove 27 is arranged near the center of the valve element 20, a space near the center of the valve element 20 can be effectively utilized.

In the present embodiment, the five through holes 21 are provided, but the number of through holes 21 can be any number equal to or greater than one. Moreover, if a plurality of through holes 21 are provided, all of the hole diameters may differ and only a part of the hole diameters may differ.

(Operation of Valve Device)

Figure 9A:
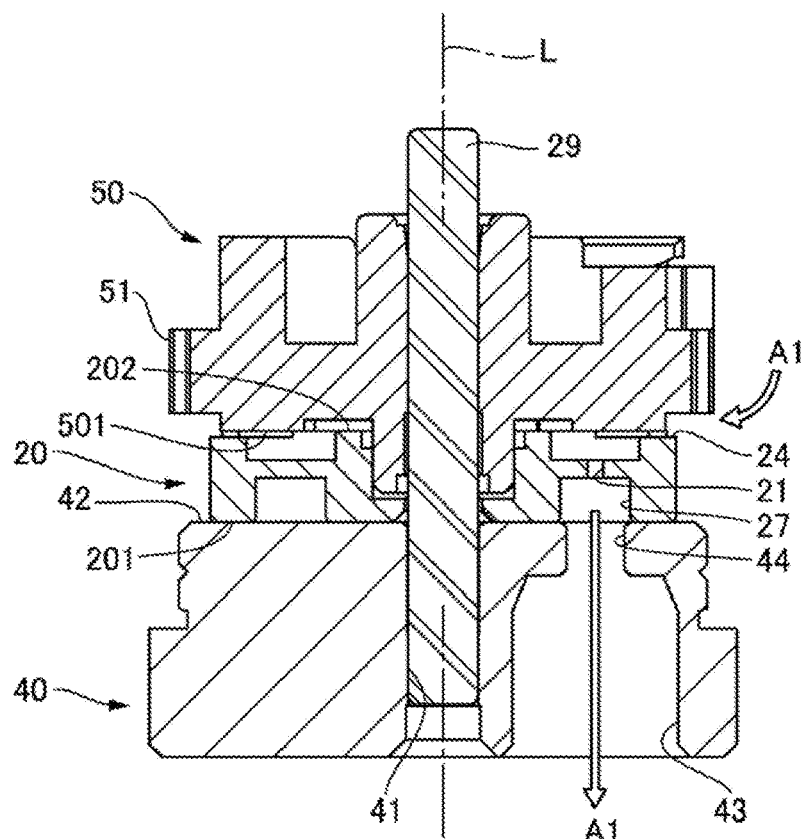
FIG. 9A and FIG. 9B are cross-sectional views illustrating an operation of the flow rate adjustment mechanism.
Figure 9B:
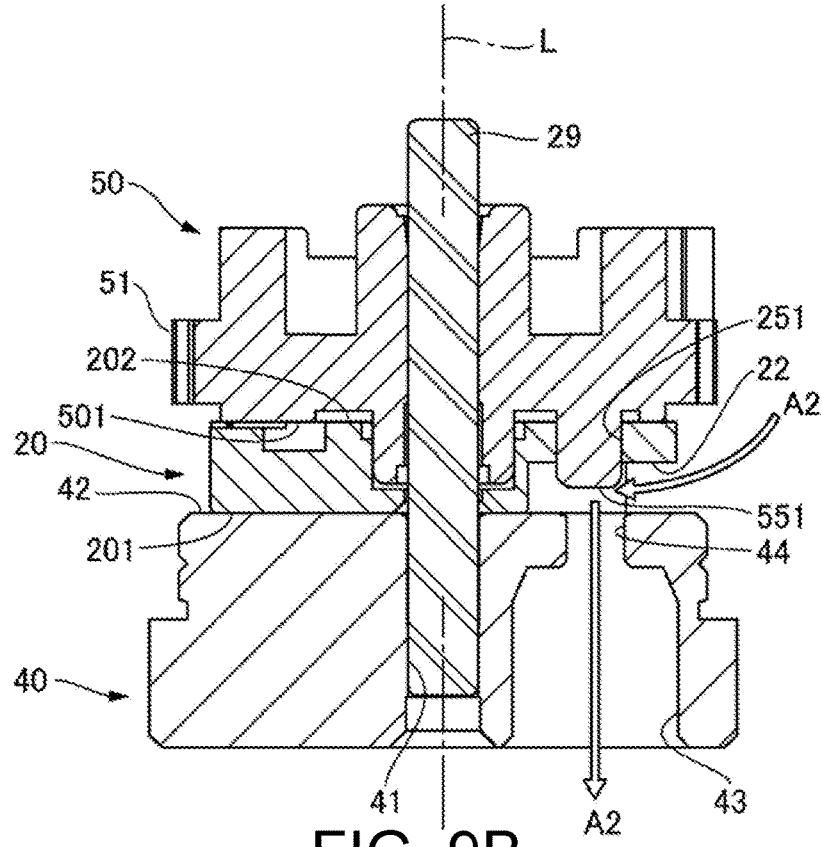

FIG. 9A and FIG. 9B are cross-sectional views each illustrating an operation of the flow rate adjustment mechanism 8. FIG. 9A illustrates a state of the flow rate adjustment mode in which the refrigerant flows through the through hole 21. Further, FIG. 9B illustrates a state of the maximum flow rate mode in which the refrigerant that has the maximum flow rate flows without passing through the through hole 21. If the stepping motor 60 is driven by an external control device, the driving force is transmitted to the valve element drive member 50 via the pinion 66 and the tooth part 51 of the valve element drive member 50. Then, if the valve element drive member 50 rotates in the circumferential direction, the valve element 20 rotates on the valve seat surface 42 in the same direction as the valve element drive member 50.

The flow rate adjustment mechanism 8 rotates the valve element 20 to a rotational position at which the cutaway part 22 of the valve element 20 overlaps in the axis L direction with the outlet 44 of the valve seat surface 42, and a rotational position at which the through hole 21 of the valve element 20 overlaps in the axis L direction with the outlet 44. In the present embodiment, since the through holes 21 are provided at five locations, there are five rotational positions where the through holes 21 overlap in the axis L direction with the outlet 44.

In the flow rate adjustment mode illustrated in FIG. 9A, the through hole 21 and the flow channel securing groove 27 formed in the lower end surface 201 of the valve element 20 overlap in the axis L direction with the outlet 44. Accordingly, a first flow channel A1 from the valve chamber 30, via the flow channel groove 24, the through hole 21, and the flow channel securing groove 27, in this order, communicating with the outlet 44 is formed. In the flow rate adjustment mode, the flow rate of the refrigerant is determined according to the hole diameter of the through hole 21. Therefore, the number of modes in the flow rate adjustment mode matches the number of modes according to the number of holes in the through hole 21. In the present embodiment, since the five through holes 21 are formed, the flow rate adjustment mechanism 8 includes a five-step flow rate adjustment mode, and can adjust the flow rate in five steps.

In the maximum flow rate mode illustrated in FIG. 9B, if the cutaway part 22 and the outlet 44 of the valve element 20 overlap in the axis L direction, a second flow channel A2 from the valve chamber 30 to the outlet 44 via the cutaway part 22 is formed. Since the cutaway part 22 of the present embodiment exposes a whole of the outlet 44 into the valve chamber 30, the second flow channel A2 outputs the refrigerant at a maximum flow rate of the valve device 1.

The valve device 1 controls the number of driving steps of the stepping motor 60 to control the rotational position of the valve element 20. An origin position of the valve element 20 is a position where the arm part 52 of the valve element drive member 50 abuts against a rotation restricting part of the rotor 61. Thus, the valve element 20 at the origin position is restricted from rotating toward a side of the rotation restricting part. If the valve element 20 is at the origin position, a flat surface part being a region where the cutaway part 22 and the flow channel securing groove 27 in the lower end surface 201 of the valve element 20 are not formed, blocks the outlet 44 formed in the valve seat surface 42. That is, the supply stop mode in which the supply of the refrigerant is stopped, is established.

If the stepping motor 60 is driven by a predetermined step in a forward rotation direction from the state where the valve element 20 is at the origin position, the valve element 20 moves to a position where the through hole 211 overlaps in the axis L direction with the outlet 44. As a result, the flow rate adjustment mode illustrated in FIG. 9A is established, and the first flow channel A1 is formed. In the present embodiment, among the through holes 21 provided in the valve element 20, the through hole 211 is a penetration part that has the smallest hole diameter. Therefore, the refrigerant flows at the minimum flow rate.

In the flow rate adjustment mode, the through holes 211, 212, 213, 214, and 215 sequentially move to an angle that overlaps in the axis L direction with the outlet 44 every time the stepping motor 60 is driven by a predetermined step in the forward rotation direction. As a result, the flow rate adjustment modes are switched. The through holes 211, 212, 213, 214, and 215, which increase in hole diameter in this order, are sequentially switched to a mode in which a flow rate is large.

When the stepping motor 60 is driven by a prescribed step further in a forward rotation direction from the state where the through hole 215 that has the largest diameter overlaps in the axis L direction with the outlet 44, the valve element 20 moves to a position at which the cutaway part 22 overlaps in the axis L direction with the outlet 44. As a result, the maximum flow rate mode illustrated in FIG. 9B is established, and the second flow channel A2 is formed. When the stepping motor 60 is further driven from this state, the arm part 52 of the valve element drive member 50 abuts against the rotation restricting part of the rotor 61 from a side opposite to the origin position, and the valve element 20 is restricted from further rotation. Even at this position, the cutaway part 22 of the valve element 20 overlaps in the axis L direction with the outlet 44. Therefore, the flow rate reaches the maximum flow rate.

OTHER EMBODIMENTS

In the above embodiment, the movement direction of the valve element 20 is the rotation direction centered around the axis L, but it may be possible to adopt a structure in which the flow rate is adjusted by sliding the valve element 20 in a predetermined direction.

The invention claimed is:

1. A valve device, comprising:
a valve chamber to be supplied with fluid;
a valve seat surface provided inside the valve chamber;
a valve element mounted at a position overlapping with an opening part provided in the valve seat surface;
a valve element drive member that moves the valve element along the valve seat surface; and
a drive source that drives the valve element drive member, wherein
the valve element includes at least one concave part provided on an abutment surface abutting against the valve seat surface, and at least one through hole opening in a bottom surface of the at least one concave part,
in the at least one concave part, a width in a first direction being a movement direction of the valve element by the valve element drive member is smaller than a width in a second direction orthogonal to the first direction,
the valve element includes a flow channel groove formed on an opposite surface facing an opposite side of the abutment surface, and the at least one through hole opens in a bottom surface of the flow channel groove,
the valve element is formed with a fitting concave part that fits with the valve element drive member, and
the fitting concave part is continuous to the flow channel groove.

2. The valve device according to claim 1, wherein
an edge of the at least one concave part includes a straight line part positioned on either side in the first direction of the at least one through hole.

3. The valve device according to claim 1, wherein
the valve element drive member rotates the valve element about a rotation axial line perpendicular to the valve seat surface, and the opening part is located on a movement trajectory of the at least one through hole obtained when the valve element rotates about the rotation axial line,
the first direction is a circumferential direction centered around the rotation axial line,
the second direction is a radial direction centered around the rotation axial line, and
the at least one concave part has a long hole shape in which a width in the circumferential direction is smaller than a width in the radial direction.

4. The valve device according to claim 3, wherein
an outer shape of the valve element is circular centered around the rotation axial line, and the at least one through hole is circular.

5. The valve device according to claim 4, wherein
a center of the at least one concave part in the radial direction is closer to a rotation center of the valve element than an outer peripheral edge of the valve element.

6. The valve device according to claim 3, wherein
the at least one concave part includes a plurality of concave parts,
the at least one through hole includes a plurality of through holes respectively opening in the bottom surfaces of the plurality of concave parts, the plurality of through holes are arranged in a circumferential direction centered around the rotation axial line,
at least some of the plurality of through holes are different in hole diameter, and in the abutment surface, and the plurality of concave parts are formed at positions separated from one another in the circumferential direction.

7. The valve device according to claim 1, wherein
the at least one concave part includes a plurality of concave parts,
the at least one through hole includes a plurality of through holes respectively opening in the bottom surfaces of the plurality of concave parts, the valve element is formed with the plurality of through holes, and at least some of the plurality of through holes are different in hole diameter, and
in the abutment surface, the plurality of concave parts are formed at positions separated from one another.

8. The valve device according to claim 1, wherein
the opposite surface faces the valve element drive member, and
the opposite surface includes a support surface abutting against the valve element drive member.

9. The valve device according to claim 1, wherein
a depth of the at least one concave part is deeper than a hole diameter of the at least one through hole.

10. The valve device according to claim 1, wherein
the abutment surface is formed with a cutaway part at a position separated from the at least one concave part, and
the cutaway part has a width in the first direction larger than a width in the first direction of the opening part and opens to an outer peripheral surface of the valve element.

11. The valve device according to claim 1, wherein
the drive source is a stepping motor, and
the valve element drive member is a gear member having a tooth part formed on an outer peripheral surface of the valve element drive member, and
a driving force of the drive source is transmitted to the valve element drive member where rotation from the drive source is decelerated.

* * * * *